United States Patent

Ogawa et al.

Patent Number: 5,629,088
Date of Patent: May 13, 1997

[54] HYDROPHILIC SUBSTRATE AND METHOD OF MANUFACTURING THE SAME

[75] Inventors: Kazufumi Ogawa, Hirakata; Mamoru Soga, Osaka; Norihisa Mino, Settu, all of Japan

[73] Assignee: Matsushita Electric Industrial Co., Ltd., Osaka, Japan

[21] Appl. No.: 426,477

[22] Filed: Apr. 20, 1995

Related U.S. Application Data

[63] Continuation of Ser. No. 914,535, Jul. 17, 1992, abandoned.

[30] Foreign Application Priority Data

| Jul. 23, 1991 | [JP] | Japan | 3-182147 |
| Jul. 23, 1991 | [JP] | Japan | 3-182148 |
| Jul. 23, 1991 | [JP] | Japan | 3-182149 |

[51] Int. Cl.⁶ .................. B32B 9/00
[52] U.S. Cl. ............ 428/391; 428/325; 428/375; 428/392; 428/367; 428/447; 428/457; 428/435; 428/688
[58] Field of Search ............... 428/391, 392, 428/375, 411.1, 325, 447, 457, 435, 688, 694

[56] References Cited

U.S. PATENT DOCUMENTS

| 2,531,571 | 11/1950 | Hyde | 428/391 |
|---|---|---|---|
| 2,563,288 | 8/1951 | Steinman | 428/391 |
| 3,844,826 | 10/1974 | Buchner et al. | 428/391 |
| 3,859,320 | 1/1975 | Atherton | 428/391 |
| 4,188,454 | 2/1980 | Foley et al. | 428/391 |
| 4,368,239 | 1/1983 | Nakajima et al. | 428/421 |
| 4,429,024 | 1/1984 | Ueno et al. | 428/694 |
| 4,434,210 | 2/1984 | Nakajima et al. | 428/447 |
| 4,539,061 | 9/1985 | Sagiv | 156/278 |
| 4,599,266 | 7/1986 | Nakayama et al. | 428/694 |
| 4,601,950 | 7/1986 | Iida et al. | 428/421 |
| 4,636,437 | 1/1987 | Algrim et al. | 428/391 |
| 4,761,316 | 8/1988 | Ogawa | 428/64 |
| 5,124,374 | 6/1992 | Baker et al. | 428/391 |
| 5,130,194 | 7/1992 | Baker et al. | 428/367 |
| 5,209,976 | 5/1993 | Ogawa | 428/391 |
| 5,225,274 | 7/1993 | Ogawa et al. | 428/421 |
| 5,238,746 | 8/1993 | Soga et al. | 428/421 |
| 5,240,774 | 8/1993 | Ogawa et al. | 428/421 |
| 5,324,566 | 6/1994 | Ogawa et al. | 428/421 |

FOREIGN PATENT DOCUMENTS

| 0221046 | 5/1987 | European Pat. Off. . |
| 0437278 | 7/1991 | European Pat. Off. . |

OTHER PUBLICATIONS

WPIL, File Supplier, Derwent Publications, Ltd. London, GB; AN=90-294728 & JP-A-2 207 870 (Nitto Denko Corp.) Abstract.

WPIL, File Supplier, Derwent Publications, Ltd. London, GB; AN=86-193224 & JP-A-61 125 405 (Mitsubishi Rayon KK) Abstract.

*Primary Examiner*—Patrick Ryan
*Assistant Examiner*—J. M. Gray
*Attorney, Agent, or Firm*—Fish & Richardson P.C.

[57] ABSTRACT

According to the invention, a durable hydrophilic absorbed film is formed on the surface of a substrate including metals, glass, plastics and the like in which the substrate has a surface layer containing hydroxyl groups or imino groups. The film is formed by covalently bonding chemical absorbents of silane groups containing a pluralilty of chloro groups to the substrate surfaces. The substrate 1 such as glass or nylon is dipped and held in a non-aqueous solution containing fluorocarbon groups and hydrocarbon groups containing chemical absorbents of silane groups containing a plurality of chloro groups including $SiCl_4$, $Cl_3SiOSiCl_3$, $HSiCl_3$ or $Cl_3SiOSiCl_2OSiCl_3$. After taking out the substrate 1 from the solution, drying it in a low moisture or substantially moistureless atmosphere to remove said non-aqueous solvents, the substrate is exposed to the air. A hydrophilic adsorbed ultra-thin film is thus formed by a dehydrochlorination reaction.

4 Claims, 6 Drawing Sheets

HYDROPHILIC SUBSTRATE AND METHOD OF MANUFACTURING THE SAME

This application is a continuation of U.S. application Ser. No. 07/914,535, filed Jul. 17, 1992, now abandoned.

FIELD OF THE PRESENT INVENTION

The present invention relates to a method of making a surface of a substrate hydrophilic. More particularly, the invention relates to a method of making the surface of metals, ceramics, glass, plastics, synthetic fibers, paper and like materials hydrophilic by manufacturing a hydrophilic thin film.

The invention also relates to a hydrophilic fiber. More particularlly, the invention relates to high-performance chemical or synthetic fiber apparel products, such as underwear and sportswear.

BACKGROUND OF THE INVENTION

Heretofore, as a method to make the surface of metals, ceramics, glass, plastics, synthetic fibers, paper and like materials hydrophilic, silicon surface active agents, polyethylene glycol surface active agents, poly(hydroxylethyl metacrylate) surface active agents, polyvinyl alcohol coatings, various anti-static additives including anionic surface active agents, cationic surface active agents, non-ionic surface active agents and ampholytic surface active agents were applied to the surface.

Polyester, nylon, polyolefin, acrylic like synthetic fibers and rayon fibers like artificial fibers can be used in various industries for use in clothing, commercial and retail use, construction and resin reinforcement. Especially, synthetic fibers can be used due to lightness, strength, relatively low-price and variety of coloring. In these industries, refining the surface of synthetic fibers is often required. Applying a hydrophilic adsorbed film is one of the methods for refining the surface.

For example, a feature of clothing such as underwear, sportswear and socks made of polyester, nylon, acrylic and like synthetic fibers is that it does not absorb water or moisture, which makes it possible to manufacture light weight clothing. However, since most synthetic fibers except vinylon are hydrophobic, they have some problems such as being uncomfortable when wearing due to low sweat absorbency and low permeability. In order to solve the problems, many attempts have been made. One method is to deform the fiber section. Another way is to coat a surface active agent on the surface. Another way is to manufacture the fabric structure, nit fabrication, and sewing design in various ways.

Also, a further problem is that such fibers are easily electrically charged and tend to stick to the body due to water-repellency. In order to alleviate the problem, some methods have been taken, which add fiber treatment agents or spray anti-charging agents on the fibers.

Also, a highly hydrophilic property is useful for industrial use. For example, if a fishing net is highly hydrophilic, it sinks into the water quickly. In another example, if the surface of synthetic fibers is highly hydrophilic when strengthening the resin, adhesion between the fiber and resin will be improved. A highly hydrophilic property is also required when strengthening the adhesion to the surface of cement, concrete and like materials. It is also required to make the surface of synthetic fibers of towels, sanitary products, diaper, sanitary napkin and like products hydrophilic.

However, the conventional methods aforementioned have a serious problem in which surface active agent molecules and coating material molecules do not bond covalently to the surface of a substrate, which causes poor durability. Especially, since improvement in sweat absorbency and permeability is limited in clothings, further development is needed.

SUMMARY OF THE INVENTION

It is a primary object of this invention to provide a method to solve the problem noted above, in which the surface of metals, ceramics, glass, plastic, synthetic fibers, paper and like materials is made hydrophilic by coating a highly-durable ultra-thin film which is manufactured by covalently bonding the fiber surface to the hydrophilic group.

It is another object of this invention to provide a method to make only the surface of the fibers hydrophilic, without adversely affecting the intrinsic features of the synthetic fibers.

According to a first aspect of the invention we provide a hydrophilic substrate comprising a chemically adsorbed film as a surface layer covalently bonded to the substrate by —Si— bonds, said chemically adsorbed film containing polysiloxane groups.

It is preferable in this invention that the polysiloxane-containing chemically adsorbed film is laminated to a siloxane-based inner layer, the inner layer being bonded by covalent bonds to the substrate surface, the inner layer and the chemically adsorbed film being bonded together by covalent bonds.

It is preferable in this invention that the substrate is made of a material selected from the group consisting of fibers, metals, ceramics, glass, plastics, papers.

It is preferable in this invention that the substrate is a synthetic fiber, said synthetic fiber is used in the manufacture of apparel material.

According to a second aspect of the invention we provide a method of manufacturing a hydrophilic substrate comprising the steps of contacting the substrate containing active hydrogen groups at the surface in a non-aqueous organic solution of a silane-based surface active material having a plurality of halogen groups, thereby adsorbing the silane-based surface active material to the substrate surface, drying in a substantially moistureless or a low moisture atmosphere to remove non-aqueous solvent, and then reacting in a humid atmosphere to obtain a chemically adsorbed polymer film at the substrate surface.

It is preferable in this invention that the material containing the silane-based surface active material is at least one member selected from the group consisting of $SiCl_4$, $SiHCl_3$, $SiH_2Cl_2$, $Cl(SiCl_2O)_nSiCl_3$ where n represents an integer from 1 to 20.

It is preferable in this invention that the non-aqueous solvent is selected from the group consisting of a hydrocarbon-based organic solvent and a fluorocarbon-based organic solvent.

It is preferable in this invention that the active hydrogen group at the material surface is at least one functional group selected from the group consisting of a hydroxyl group, carboxyl group, an imino group and an amino group.

It is preferable in this invention that the active hydrogen groups at the material surface are provided by a plasma or corona treatment.

Further, according to the invention a hydrophilic monomolecular film having a thickness on the order of nanometer is formed on an apparel material. It is possible to selectively make only the surface of the fiber material hydrophilic. Intrinsic water-free characters of the synthetic fiber material such as luster and resiliency are not spoiled. It is thus possible to provide a high performance apparel material, which is highly hydrophilic and has excellent feel.

DETAILED DESCRIPTION OF THE INVENTION

The present invention is described in detail with reference to specific examples.

A substrate having a surface which contains hydrophilic groups such as hydroxyl, carboxyl, amino and imino groups is dipped in a non-aqueous solution containing chemical absorbents of silane groups containing a plurality of chloro groups, where a monomolecular film containing chemical absorbents of silane groups containing a plurality of chloro groups is formed via covalent bonds as a result of a dehydrochlorination reaction. After taking out the substrate from the solution noted above, and drying it in a substantially moistureless or a low moisture atmosphere to remove non-aqueous solvent, a laminated film containing chemical absorbents of silane groups containing a plurality of chloro groups as noted above is formed on the surface of the monomolecular film. Whereafter the substrate is exposed to air and the laminated film is polymerized due to a dehydrochlorination reaction caused by moisture in the air. At the same time, since the laminated film forms a covalent bond with said monomolecular film, and unreacted chloro groups are converted to OH groups, an excellent hydrophilic thin film containing numerous —OH groups can be formed on the surface of the substrate via said monomolecular film.

Further, usual nylon (polyamide) and polyeurethane fibers contain imino groups (>NH) at the surface due the amide and urethane bonds. Since polyester and acrylic fibers contain no imino groups, the surface may be slightly oxidized by introducing hydroxyl groups. After washing the polyamide noted above and like materials which have added hydroxyl or imino or carboxyl groups on the surface of the fiber or cloth, the fibers are dipped in a non-aqueous solution containing a plurality of chloro groups. Thus a monomolecular film containing a plurality of chloro groups on the fiber surface can be formed by covalent bonds after a dehydrochlorination reaction. After taking the fiber out of the solution and drying in a substantially moistureless or low moisture atmosphere, the laminated film containing the plurality of chloro groups can be formed on the surface of the monomolecular film. Thereafter, this laminated film is polymerized by a dehydrochlorination reaction after exposing to air containing moisture (i.e., humid air). At this time, the laminated film forms covalent bonds with the monomolecular film. Furthermore, the ultra-thin hydrophilic polysiloxane film containing a large amount of OH groups which are bonded to the fiber surface can be formed.

As a non-aqueous solvent, hydrocarbon or fluoroalkyl groups are suitable because of their non-toxicity. This invention relates to synthetic fibers such as polyester, nylon, polyolefine, acrylic fiber, aramido fiber and chemical fiber such as rayon, and natural fibers such as cotton, hemp, silk and wool.

This invention is useful for making the following materials hydrophilic: clothing, bath and sanitary products, sanitary napkins, sheets, interior items such as carpets, fishing nets, fishing line, tire cord for industrial use, materials for use in construction, and materials used for reinforcing resin.

The apparel, to which the invention pertains, includes underwear, sportswear and other materials. The following description of examples concerns textiles made of polyester, acrylic, nylon, polyurethane fibers.

Fiber materials such as socks woven of said fiber having a surface contains hydrophilic groups such as hydroxyl, carboxyl, amino and imino groups are dipped in a non-aqueous solution containing chemical absorbents of silane groups containing a plurality of chloro groups, where a monomolecular film containing chemical absorbents of silane groups containing a plurality of chloro groups is formed via covalent bonds formed by a dehydrochlorination reaction. After taking out the fiber material or socks from the solution noted above, and drying it in a substantially moistureless or low moisture atmosphere to remove non-aqueous solvent, a laminated film containing chemical absorbents of silane groups containing a plurality of chloro groups as noted above is formed on the surface of the monomolecular film. Whereafter the substrate is exposed to air and the laminated film is polymerized due to a dehydrochlorination reaction due to moisture in the air. At the same time, since the laminated film forms a covalent bond with said monomolecular film, and unreacted chloro groups are converted to OH groups, an excellently hydrophilic ultra-thin film containing numerous —OH groups can be formed on the surface of the substrate via said monomolecular film.

Examples of this invention include stockings for women, socks for men and women, sports socks, tights and Japanese socks (tabi).

As chemical absorbents of silane groups containing a plurality of chloro groups $SiCl_4$, $SiHCl_3$, $SiH_2Cl_2$, $Cl(SiCl_2O)_nSiCl_3$ (where n represents an integer from 1 to 20), are suitable due to having many active sites for a dehydrochlorination reaction.

As a non-aqueous solution, hydrocarbon or fluoroalkyl groups are suitable because of their non-toxicity. According to the invention, the method of making subtrates hydrophilic can be attained by using $SiCl_4$, $SiHCl_3$, $SiH_2Cl_2$, $Cl(SiCl_2O)_nSiCl_3$ (where n represents an integer from 1 to 20), as chemical absorbents containing a plurality of chloro groups and using hydrocarbon or fluoroalkyl groups as a non-aqueous solution. The following examples concern the typical methods of making substrates hydrophilic

EXAMPLE 1

Figure 1:
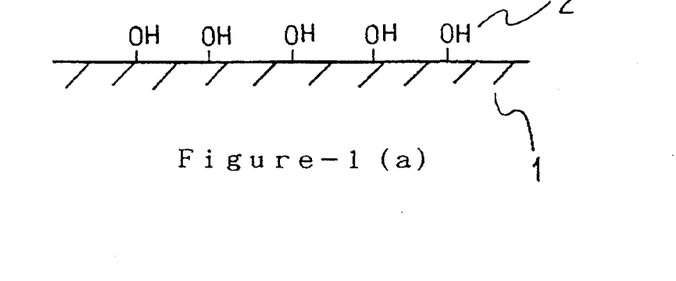
FIGS. 1(a)–(c) show a glass substrate as in example 1 of the invention.

A processed glass substrate 1 (according to whichever materials are preferred such as metals, ceramics, plastic, synthetic fibers and like materials of which surfaces contain functional groups including hydroxyl, carboxyl and imino groups which cause a dehydrochlorination reaction with a chlorosilane group) was prepared (FIG. 1(a)). After washing, the glass substrate was dipped and held in a fluoroalkyl group solution (e.g., AFLUID manufactured by ASAHI GLASS Co.) for ten minutes containing chemical absorbents of silane groups containing a plurality of chloro groups, e.g., a solution containing 1% by weight of $SiCl_4$ (or, $SiHCl_3$, $SiH_2Cl_2$, $Cl(SiCl_2O)_nSiCl_3$ where n represents an integer from 1 to 20, was available). The surface of the substrate contains hydroxyl groups 2, and the chemical bonds are attained as follows (Formula [1]).

[Formula 1]

Thus, a siloxane-containing monomolecular film 3 containing numerous Cl groups were formed. The film was covalently bonded to the surface of the substrate. The covalent bonds were via siloxane bonds (FIG. 1(b)).

Without washing with an organic solvent, the glass substrate was subsequently dried in a substantially moistureless or low moisture atmosphere, preferably less than or equal to about 5% relative humidity. Thus, $SiCl_4$ molecules remaining on the glass substrate surface formed a laminated film 4 having a thickness of about 10 nm. Thereafter, the laminated film was polymarized by a dehydrochlorination reaction with moisture (i.e., humid air at greater than or equal to about 30% relative humidity) contained in the atmosphere. As a result, since the laminated film formed a covalent bond with the monomolecular film 3 and unreacted chloro groups were converted to OH groups, the ultra-thin hydrophilic film 5 was formed as represented by formula [2].

[Formula 2]

As a result, the ultra-thin hydrophilic polysiloxane film 5 containing a large amount of —OH groups was formed on the surface of the glass substrate (FIG. 1(c)).

The formation of the covalently adsorbed monomolecular film was confirmed by FTIR spectrometry, and its thickness was measured about 0.3 nm by ESCA.

This ultra-thin film was perfectly bonded by covalent bonds to the glass substrate and did not separate at all during rubbing or washing the film. Moreover, the ultra-thin film is so highly hydrophilic that a water-wetting angle could not be measured.

EXAMPLE 2

Figure 2A:
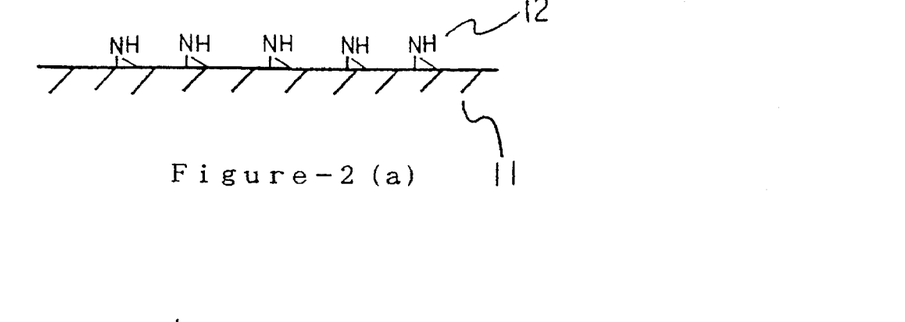
FIGS. 2(a)–(c) show a nylon-ABS substrate as in example 2 of the invention.

Processed nylon resin (polymer alloy or polymer blend) substrate 11 was prepared (FIG. 2(a)). After washing, the substrate was dipped and held for 10 minutes in a fluoroalkyl solution such as normal hexane containing chemical absorbents of silane groups containing a plurality chloro groups, e.g., a solution containing 1% by weight of $Cl_3SiOSiCl_3$ ($SiHCl_3$, $Cl_3SiOSiCl_2OSiCl_3$ was available). The surface of substrtate contained imino groups (>NH) 12, and covalent bonds were formed as follows (Formula [3]). Thus a siloxane-containing monomolecular film 13 containing numerous Cl groups was formed. The film was covalently bonded to the surface of the substrate. The covalent bond was via siloxane bonds (FIG. 2(b)).

Figure 2B:
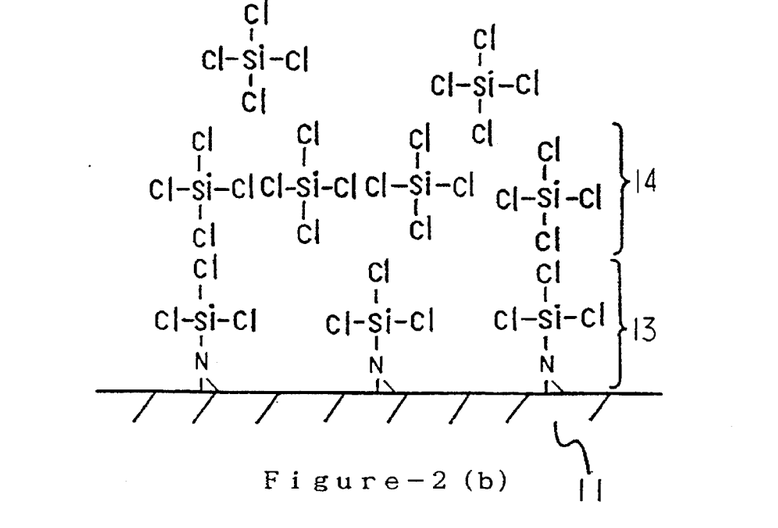

[Formula 3]

Figure 2C:
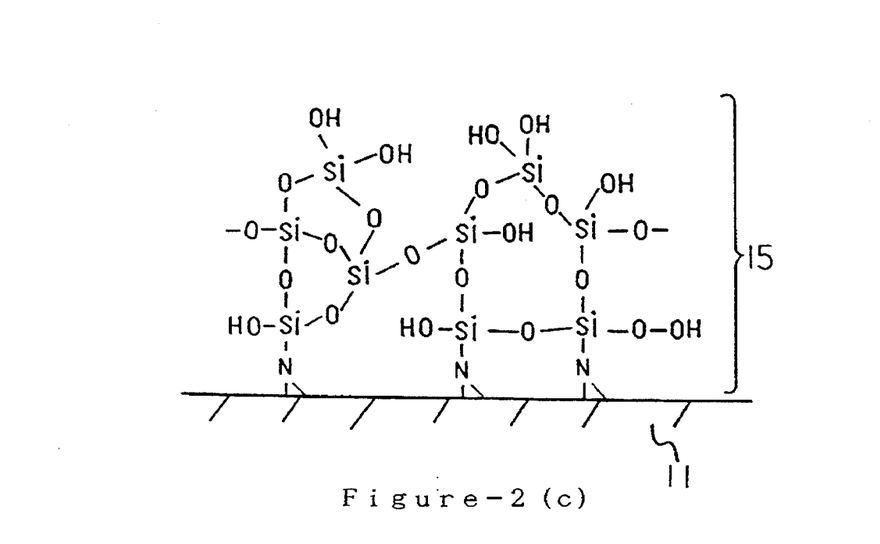

Without washing with an organic solvent, the substrate was subsequently dried in a low atmosphere, preferably less than or equal to about 10% relative humidity. Thus, $Cl_3SiOSiCl_3$ molecules remaining on the substrate surface formed the laminated film 14 which had a thickness of about 20 nm. Thereafter, the laminated film was polymerized due by a dehydrochlorination reaction with moisture (greater than or equal to about 30% relative humidity) contained in the atmosphere. As a result, since the laminated film formed a covalent bond with the monomolecular film as shown in [formula 3] and unreacted chloro groups were converted to OH groups, the ultra-thin hydrophilic film 15 containing numerous —OH groups bonded to the surface of the substrate (FIG. 2(c)).

The formation of the covalently adsorbed monomolecular film was confirmed by FTIR spectrometry, and its thickness was measured about 0.3 nm by ESCA.

This ultra-thin film was perfectly bonded by covalent bonds to the substrate and did not separate at all by rubbing or washing the film. Moreover, the ultra-thin film is so highly hydrophilic that a water-wetting angle could not be measured.

We mentioned a glass or nylon-ABS (polymer alloy or polymer blend) resin as a substrate in the example noted above. However, other substrates are available which contain functional surface groups such as hydroxyl groups, imino groups, and carboxyl groups that cause a dehydrochlorination reaction with chlorosilane groups.

EXAMPLE 3

A processed polyester sports shirt or cloth (alternatively acrylic cloth) was prepared. To introduce hydroxyl groups which react with chlorosilane on the surface of the cloth, the cloth was dipped in a solution containing dichromate at 70° C. for thirty minutes. The surface of the cloth was thus oxidized (FIG. 3(a)). Thereafter, the cloth was dipped and held in a fluoroalkyl group solution (e.g., AFLUID manufactured by ASAHI GLASS) for ten minutes containing chemical absorbents of silane groups containing a plurality of chloro groups, e.g., a solution containing 1% by weight of $SiCl_4$, ($HSiCl_3$, $SiH_2Cl_2$, $Cl_3SiOSiCl_3$, $Cl_3SiOSiCl_2OSiCl_3$ was available).

Figure 3A:
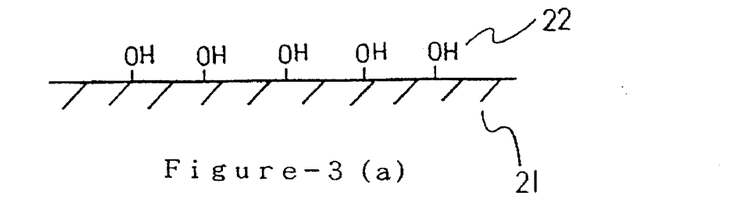
FIGS. 3(a)–(c) show a polyester fiber as in example 3 of the invention.

The surface of the cloth contains hydroxyl groups 22 and the chemical bonds are formed as follows (Formula [4]).

[Formula 4]

Thus, a siloxane-containing monomolecular film 23 containing numerous Cl groups were formed. The film was covalently bonded to the surface of the cloth. The covalent bonds were via siloxane bonds (FIG. 3(b)).

Figure 3B:
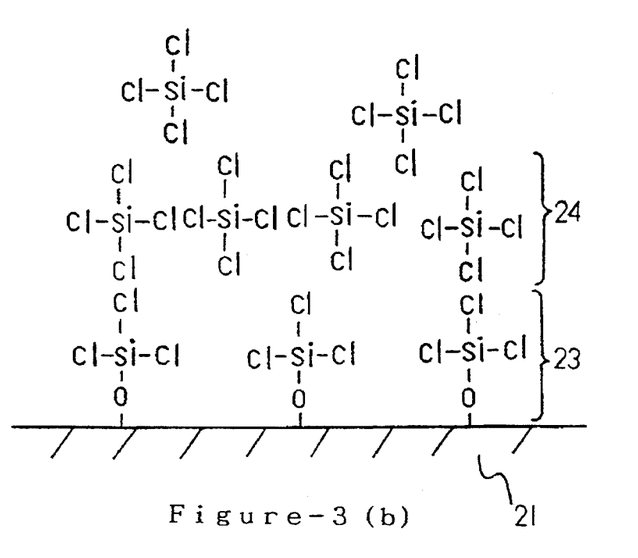
Figure 3C:
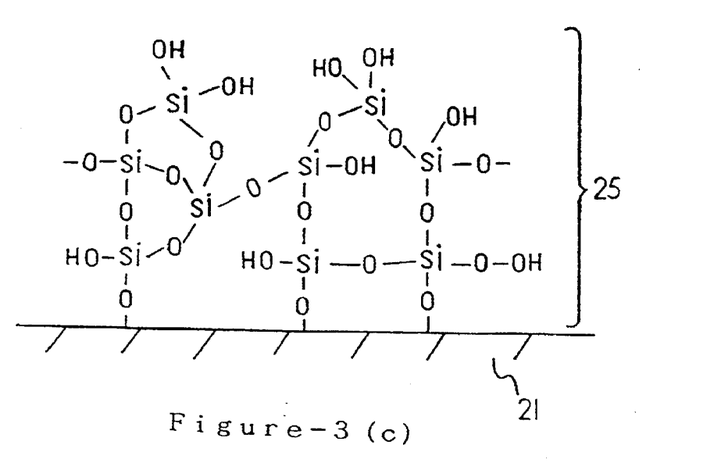

Without washing with an organic solvent, the cloth was subsequently dried in a low moisture atmosphere, preferably less than or equal to about 5% relative humidity. Thus, $SiCl_4$ molecules remaining on the cloth surface formed the laminated film 24 which had a thickness of about 10 nm. Thereafter, the laminated films were polymerized due to a dehydrochlorination reaction with moisture (greater than or equal to about 30% relative humidity) contained in the atmosphere. As a result, since the laminated film forms a covalent bond with monomolecular film 3 noted above, and unreacted chloro groups were converted to OH groups, the ultra-thin hydrophilic film 25 containing numerous OH groups bonded to the surface of the substrate cloth (FIG. 4(b)).

The formation of the covalently adsorbed monomolecular film was confirmed by FTIR spectrometry, and its thickness was measured about 0.3 nm by ESCA.

This ultra-thin film was perfectly bonded by covalent bonds to the cloth and did not separate at all in by rubbing or washing the film. Moreover, the ultra-thin film was so highly hydrophilic that a water-wetting angle could not be measured.

EXAMPLE 4

Figure 4A:
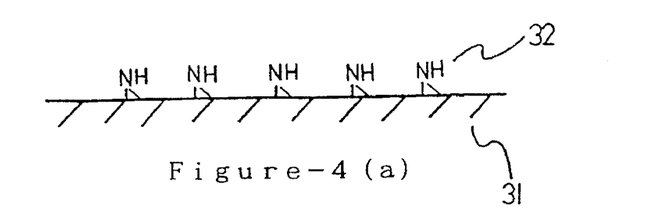
FIGS. 4(a)–(c) show a polyurethane fiber as in example 4 of the invention.

Processed nylon underwear (alternatively polyurethane cloth) 31 was prepared (FIG. 4(a)). After washing, the cloth was dipped and held for 10 minutes in a fluoroalkyl solution such as normalhexane containing chemical absorbents of silane groups containing a plurality of chloro groups, e.g., a solution containing 1% by weight of $Cl_3SiOSiCl_3$ ($SiHCl_3$, $Cl_3SiOSiCl_2OSiCl_3$ was available). The surface of the cloth contains imino groups 32 and the chemical bonds are attained as follows (Formula [5]). Thus, a siloxane-containing monomolecular film 33 containing numerous Cl groups were formed. The film was covalently bonded to the surface of the cloth. The covelent bond was via siloxane bonds (FIG. 4(b)).

Figure 4B:
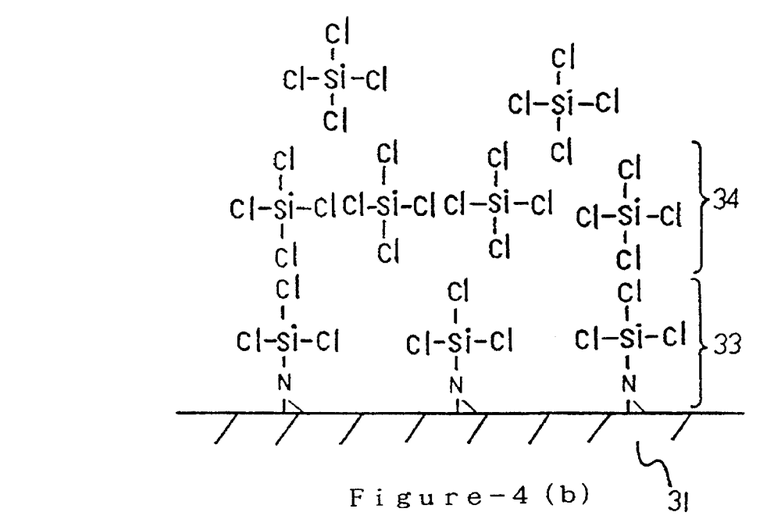

[Formula 5]

Without washing with an organic solvent, the substrate was subsequently dried in a low moisture atmosphere, preferably less than or equal to about 10% relative humidity.

Figure 4C:
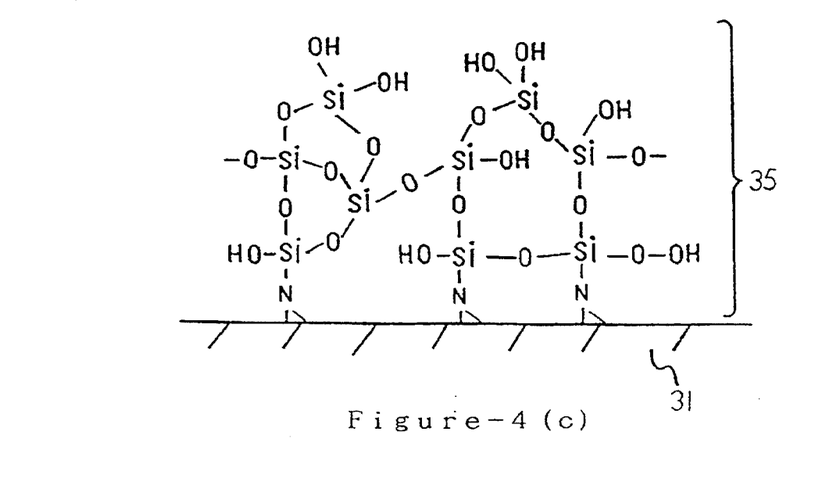

Thus, $Cl_3SiOSiCl_3$ molecules remaining on the substrate surface formed of the laminated film 34 which had a thickness of about 20 nm. Thereafter, the laminated films were polymerized due to a dehydrochlorination reaction with moisture (greater than or equal to about 30% relative humidity) contained in the atmosphere. As a result, since the laminated film forms a covalent bond with the monomolecular film as shown in (formula [5]) and unreacted chloro groups were converted to OH groups, the ultra-thin hydrophilic film 35 containing numerous OH groups bonded to the surface of the substrate (FIG. 4(c)).

The formation of the covalently adsorbed monomolecular film was confirmed by FTIR spectrometry, and its thickness was measured about 0.3 nm by ESCA.

This ultra-thin film was perfectly bonded by covalent bonds to the substrate and did not separate at all by rubbing or washing the film. Moreover, the ultra-thin film was so highly hydrophilic that a water-wetting angle could not be measured.

We mentioned a fiber or a cloth as examples noted above, however, artificial leather or synthetic resins and the like can be used.

EXAMPLE 5

Socks woven of mixed-spun thread (polyester fiber 70 wt % rayon fiber 30 wt %) 41 was prepared. However, polyurethane fiber was used in the inside upper part of the socks to keep them from slipping down (FIG. 5(a)). It is possible that other fibers which contain functional surface groups that cause dehydrochlorination reaction with chlorosilane group could be used instead of the fibers noted above. After washing, the socks were dipped and held in a fluoroalkyl group solution (e.g. AFLUID manufactured by ASAHI GLASS Co.) for ten minutes containing chemical absorbents of silane groups containing a plurality of chloro groups, e.g., a solution containing 1% by weight of $SiCl_4$ (or, $SiHCl_3$, $SiH_2Cl_2$, $Cl(SiCl_2O)_nSiCl_3$ where n represents an integer from 1 to 20, was available). The surface of rayon fiber contains hydroxyl groups 42 and chemical bonds were attained as follows (Formula [6]).

Figure 5A:
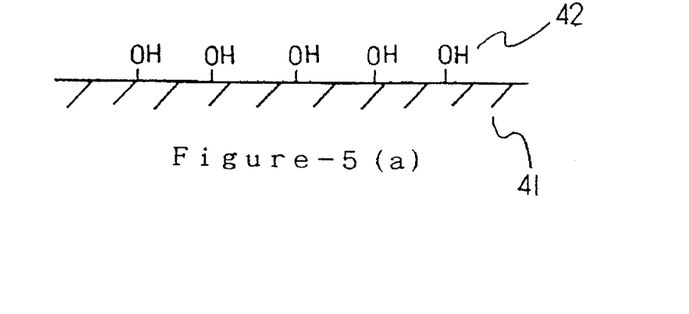
FIGS. 5(a)–(c) show socks woven of a rayon fiber as in example 1 of the invention.

[Formula 6]

Figure 5B:
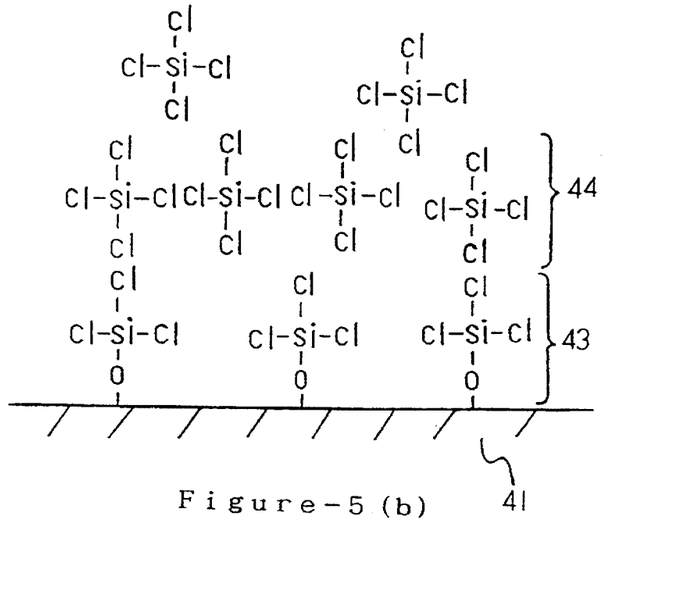

Thus, a siloxane-containing monomolecular film 43 containing numerous Cl groups were formed. The film was covalently bonded to the surface of the socks. The covalent bonds were via siloxane bonds (FIG. 5(b)).

Figure 5C:
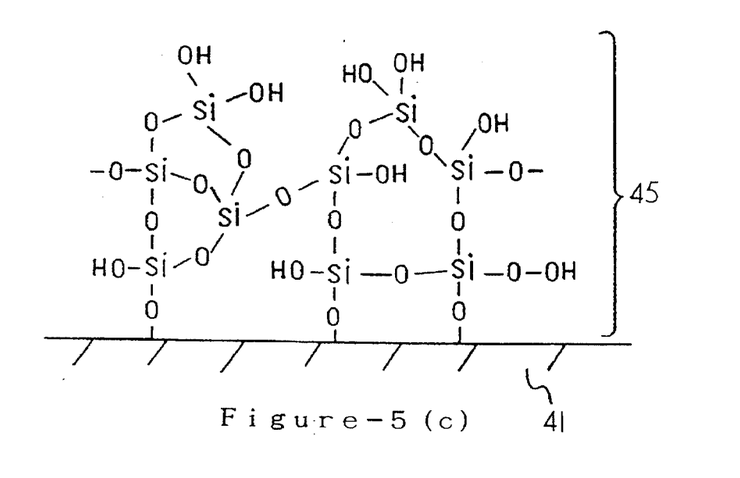

Without washing with an organic solvent, the socks were subsequently dried in a low moisture atmosphere, preferably less than or equal to about 5% relative humidity. Thus, $SiCl_4$ molecules remaining on the cloth surface formed the laminated film 44 which had a thickness of about 10 nm. Thereafter, the laminated films were polymerized due to a dehydrochlorination reaction with moisture (greater than or equal to about 30% relative humidity) contained in the atmosphere. As a result, since the laminated film forms a covalent bonds with the monomolecular film 43, and unreacted chloro groups were converted to OH groups, the ultra-thin hydrophilic film 45 containing numerous OH groups bonded to the surface of the substrate cloth (FIG. 5(c)).

The formation of the covalently adsorbed monomolecular film was confirmed by FTIR spectrometry, and its thickness, as measured by ESCA, was determined to be about 0.3 nm.

This ultra-thin film was perfectly bonded to the cloth by covalent bonds; it did not separate at all by rubbing or washing the film. Moreover, the ultra-thin film was so highly hydrophilic that a water-wetting angle could not be measured.

EXAMPLE 6

Figure 6:
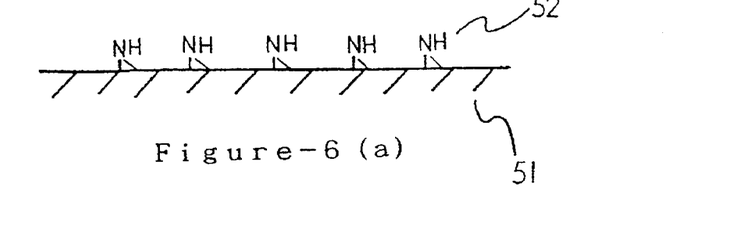
FIGS. 6(a)–(c) show socks woven of a nylon fiber as in example 2 of the invention.

Processed nylon stockings 51 were prepared (FIG. 6(a)). After washing, the stockings were dipped and held for 10 minutes in a fluoroalkyl solution such as normalhexane containing chemical absorbents of silane groups containing a plurality chloro groups, e.g., a solution containing 1% by weight of $Cl_3SiOSiCl_3$($SiHCl_3$, $Cl_3SiOSiCl_2OSiCl_3$ was available). The surface of the substrate contained imino groups 52 and chemical bonds were attained as follows (Formula [7]).

[Formula 7]

Thus, a siloxane-containing monomolecular film 53 containing numerous Cl groups were formed. The film was covalently bonded to the surface of the substrate. The covelent bonds were via siloxane bonds (FIG. 6(b)).

The formation of the covalently adsorbed monomolecular film was confirmed by FTIR spectrometry, and its thickness was measured about 0.3 nm by ESCA.

Without washing with an organic solvent, the substrate was subsequently dried in a low moisture atmosphere, preferably less than or equal to about 10% relative humidity.

Thus, $Cl_3SiOSiCl_3$, molecules remaining on the substrate surface formed the laminated film 54 which had a thickness of about 20 nm. Thereafter, the laminated films were polymerized due to a dehydrochlorination reaction with moisture (greater than or equal to about 30% relative humidity) contained in the atmosphere. As a result, since the laminated film formed a covalent bonds with the monomolecular film as shown in (formula [7]) and unreacted chloro groups were converted to OH groups, the ultra-thin hydrophilic film 55 containing numerous OH groups bonded to the surface of the substrate (FIG. 4(c)).

This ultra-thin film was perfectly bonded by covalent bonds to the substrate and did not separate at all by rubbing or washing the film. Moreover, the ultra-thin film was so highly hydrophilic that a water-wetting angle could not be measured.

We have already mentioned mixed-spun fiber cloth of polyester and rayon, or nylon in the above examples of socks and stockings which are woven with such fibers. However, it is possible that other fibers which contain functional surface groups that cause a dehydrochlororination reaction with chlorosilane groups could be used instead of the fibers noted above. As a non-aqueous solvent, whichever solvent is preferable, provided that it does not dissolve the fiber, does not contain moisture and does not react with the chlorosilyl groups may be used.

As shown in the examples of this invention, socks 51 woven of fiber which has a surface containing imino groups 52 and like groups was dipped and held in a non-aqueous solution containing chemical absorbents of silane groups containing chloro groups. Thus, a monomolecular film 53 containing chemical absorbents of silane groups containing a plurality of chloro groups was formed on the fiber surface by covalent bonds by a dehydrochlorination reaction. This film was polymerized 54 in a dehydrochlorination reaction with moisture by exposing to the air. Thus, the laminated film was covalently bonded to the monomolecular film, and then unreacted chlorosilane groups were converted to —OH groups. Thus the ultra-thin hydrophilic polysiloxane film 55 containing numerous OH groups bonded to the surface of the fiber. As a result, by covering the surface of synthetic fiber socks with an ultra-thin film containing polysiloxane, and by covalently bonding the ultra-thin film with the surface of the fiber, the socks comfortable when worn, and durable. The desirable effects such as excellent water-absorbency were realized.

As has been shown, this invention is greatly beneficial for forming an ultra-thin film containing numerous hydrophilic functional groups on the surface of synthetic fiber. Accordingly, if sweat wets the fiber, and then spreads over the whole surface, the film does not separate at all due to the firm covalent bonding with the surface of the fiber. Moreover, since the thickness of the ultra-thin film is on the level of dozens of nanometer, deterioration of the intrinsic the flexibility of fiber does not occur. Therefore, the film improves wettability of the synthetic fiber.

As has been shown, according to this invention, an excellent hydrophilic ultra-thin film is formed on the surface of a substrate by covalent bonds via a chemically adsorbed monomolecular film. Therefore, this invention provides a simple method for obtaining a durable hydrophilic fiber.

As has been shown, with the method of manufacture according to the invention, since an ultra-thin film containing hydrophilic functional groups is bonded to surface of the fiber via chemically adsorbed molecules, a hydrophilic can be manufactured efficiently.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A hydrophilic film on a substrate comprising a chemically adsorbed film covalently bonded to the substrate through —Si— atoms, wherein said chemically adsorbed film comprises polysiloxane groups, and silanol groups are present at the outermost surface of said chemically adsorbed film.

2. The hydrophilic substrate according to claim 1, wherein said polysiloxane-containing chemically adsorbed film is bonded to the substrate by virtue of the film being laminated on to a siloxane-containing inner layer, said inner layer being bonded by covalent bonds to the substrate surface, said inner layer and said chemically adsorbed film being bonded together by covalent bonds.

3. The hydrophilic substrate according to claim 1, wherein the substrate is selected from the group consisting of metals, ceramics, glass, plastics and papers.

4. The hydrophilic substrate according to claim 1, wherein the substrate is a synthetic fiber.

* * * * *